United States Patent [19]

Bossler

[11] Patent Number: 5,357,593
[45] Date of Patent: Oct. 18, 1994

[54] METHOD OF ATTACHING OPTICAL FIBERS TO OPTO-ELECTRONIC INTEGRATED CIRCUITS ON SILICON SUBSTRATES

[75] Inventor: Franklin B. Bossler, Williamsville, N.Y.

[73] Assignee: AlliedSignal Inc., Morris Township, Morris County, N.J.

[21] Appl. No.: 135,384

[22] Filed: Oct. 12, 1993

[51] Int. Cl.$^5$ ............................................. G02B 6/42
[52] U.S. Cl. ..................................... 385/49; 385/52
[58] Field of Search ............................ 385/49, 50, 52

[56] References Cited

U.S. PATENT DOCUMENTS

| | | | |
|---|---|---|---|
| 4,973,133 | 11/1990 | Matz et al. | 385/49 |
| 5,018,817 | 5/1991 | Suzuki et al. | 385/49 |
| 5,046,808 | 9/1991 | Chang | 385/49 X |
| 5,046,809 | 9/1991 | Stein | 385/49 |
| 5,059,763 | 10/1991 | O'Brien et al. | 385/49 X |
| 5,239,601 | 8/1993 | Denis et al. | 385/49 |

FOREIGN PATENT DOCUMENTS

| | | | |
|---|---|---|---|
| 60-83006 | 5/1985 | Japan | 385/49 |
| 63-115113 | 5/1988 | Japan | 385/49 |

*Primary Examiner*—John D. Lee
*Attorney, Agent, or Firm*—Donald B. Paschburg; Howard G. Massung

[57] ABSTRACT

Attachment of optical fibers to Optical Electronic Integrated Circuits on silicon substrates is accomplished by utilizing precision grooves combined with a vertical waveguide interface formed mechanically or electrochemically. The optical fiber must be prepared with a perpendicular end face.

10 Claims, 3 Drawing Sheets

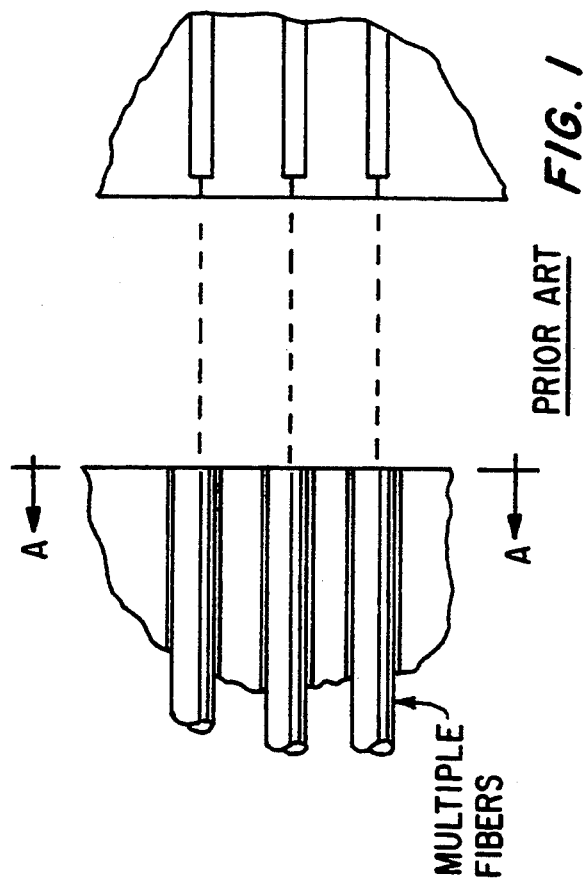
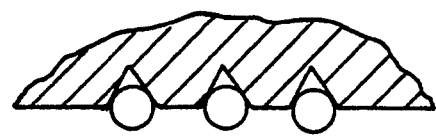
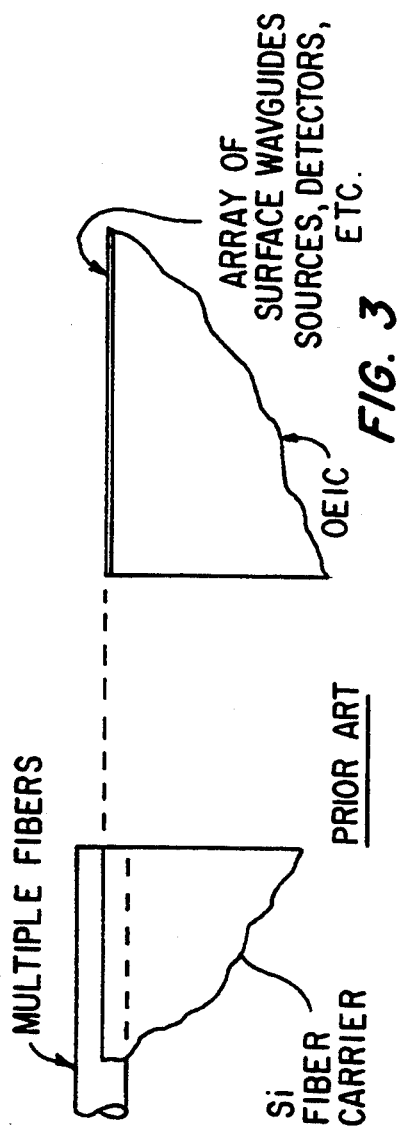

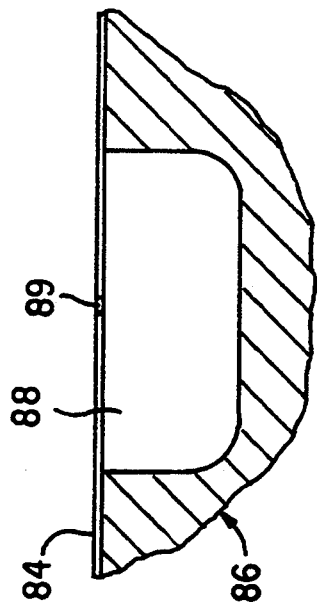
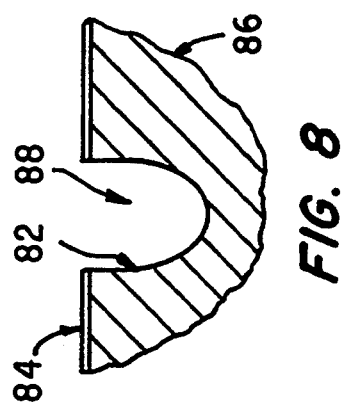
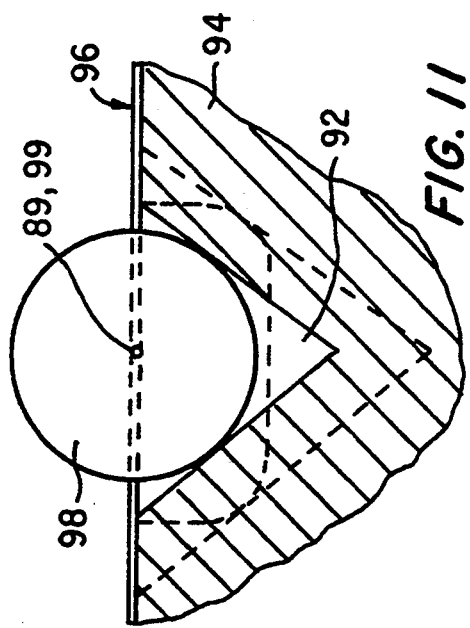
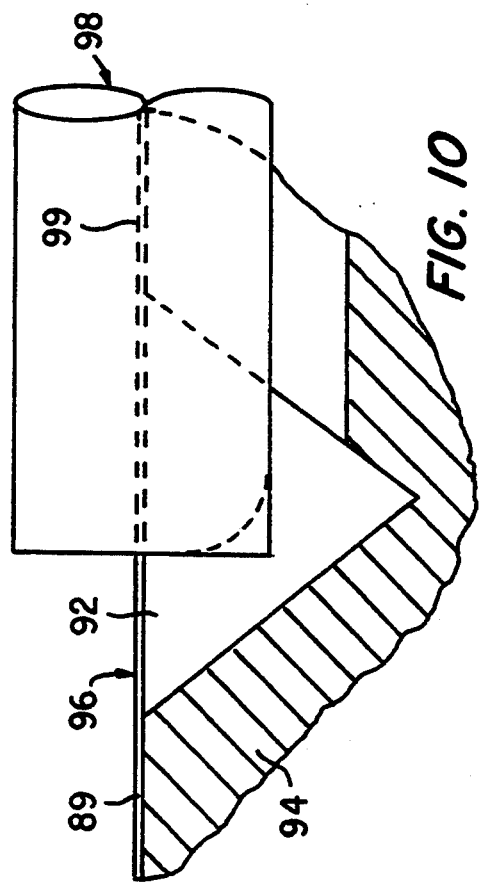

5,357,593

METHOD OF ATTACHING OPTICAL FIBERS TO OPTO-ELECTRONIC INTEGRATED CIRCUITS ON SILICON SUBSTRATES

BACKGROUND OF THE INVENTION

1. Field of the Invention

The present invention relates to optical fibers and more particularly to the attachment of optical fibers to Opto-Electronic Integrated Circuits on silicon substrates.

2. Description of the Prior Art

Optical fibers provide useful transmission of optical power from one location to another; at each end of the fiber, an attachment must be made to some other device, or to another fiber. Frequently, the attachment of the fiber to a terminal device, (either a source or a receiver of the optical power), is more likely to present a problem of cost or reliability than either the fiber or the terminal device per se. This is particularly true of the attachment of fibers to Opto-Electronic Integrated Circuits (OEICs) which are becoming the preferred receiving devices. Current methods of attaching fibers to such devices require expensive, very precise and time-consuming mechanisms to align the fiber to the optical waveguides of the OEIC within tolerances of a micron or less, which alignment must be maintained over the lifetime of the device, possibly for decades. Opto-Electronic Integrated Circuits on silicon substrates promise to become widely used because of the extensive technical and industrial base of electronic circuitry on silicon substrates.

A method which permits the attachment of optical fiber to be made to such OEICs quickly and simply with a minimum of equipment and operator skill would greatly expand the usefulness of this technology to new applications and markets.

Techniques for automatic ("Blind") alignment of single-mode fibers to integrated opto-electronic circuits using fiber grooves in silicon have been demonstrated in C. A. Armiento et al, "Passive Coupling of InGaAsP-/InP Laser Array and Single-Mode Fibers Using Silicon Waferboard", Elect. Lett. 27, p. 1109–1110, 1991 and M. S. Cohen et al, "Passive Laser-Fiber Alignment By Index Method", Photonics Technology Letters, v.3 p. 985–987, 1991. These techniques generally have used two separate pieces: one with the grooves and a vertical cleaved or polished face perpendicular to the grooves and the surface, and the other with the waveguides on the surface and a perpendicular vertical surface on which the ends of the waveguides are accessible. These techniques are illustrated in FIGS. 1–3.

SUMMARY OF THE INVENTION

The present invention provides for an improvement in the attachment of optical fibers to silicon OEICs, therefore eliminating the problems associated with precision alignment of the core of the optical fiber with the optical waveguide on the surface of the substrate. The improvement consists of providing a precision groove and a matching vertical face on the surface waveguide. The optical fiber itself must also be prepared in such a manner so that it has a perpendicular end face. By utilizing the above techniques, butt-coupling of optical fiber to the waveguide is possible.

BRIEF DESCRIPTION OF THE DRAWINGS

FIG. 1 illustrates a plan view of a prior art connection between optical fibers and surface waveguides.

FIG. 2 illustrates section A—A of FIG. 1.

FIG. 3 illustrates a side view of a prior art connection between optical fibers and surface waveguides.

FIG. 8 illustrates a side view of a pit formed in a substrate before etching.

FIG. 9 illustrates an end view of a pit formed in a substrate before etching.

FIG. 10 illustrates a side view of a substrate after etching.

FIG. 11 illustrates an end view of a substrate after etching.

DETAILED DESCRIPTION OF THE INVENTION

In an OEIC, the optical energy is guided by waveguide(s) which are formed in a transparent layer on the surface of a substrate. To send or receive optical energy in such a waveguide, to or from an optical fiber, it is necessary that the core of the optical fiber be aligned approximately parallel to the waveguide on the surface, and that the core be positioned accurately (within a micrometer or less) centered on the surface waveguide. If the substrate material is silicon and the waveguide material is glass or silica, the attachment can be accomplished as follows.

Figure 4:
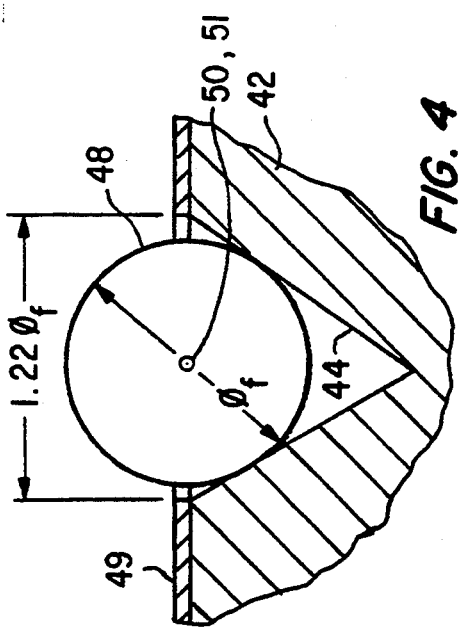
FIG. 4 illustrates an end view of a coupling between fiber and waveguide having an etched groove.
Figure 5:
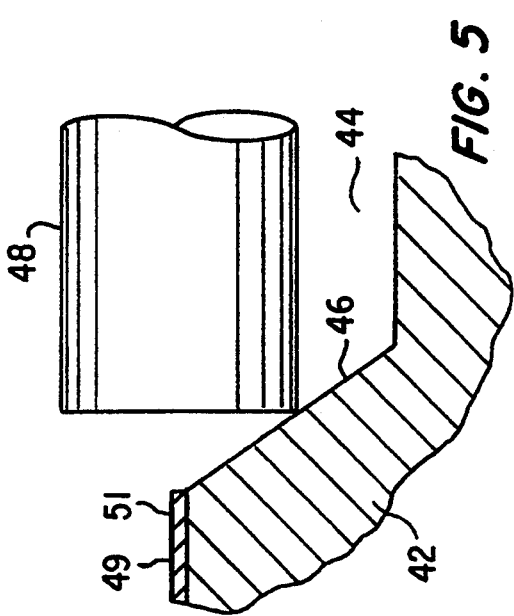
FIG. 5 illustrates a side view of a coupling between fiber and waveguide having an etched groove.

In order to achieve the desired economy of fabrication, it is desirable that the fiber be positioned in V-grooves on the same side of the silicon substrate on which the waveguide surface is formed. As shown in FIGS. 4 and 5, the standard orientation of the crystallographic axes in the substrate 42 (denoted <001> in crystallographic notation) will permit the etching of excellent V-grooves 44, with excellent control of the lateral and vertical position of the central guiding core 50 of the fiber 48 into alignment with the surface waveguide 51 in the waveguide layer 49. However, the standard <001> wafer will not etch a vertical wall at the end of the groove. The end of the groove will be a sloping wall 46 at an angle of about 55 degrees, as shown in FIG. 5, therefore preventing butt-coupling of the core 50 of the fiber 48 to waveguide 51 in the surface layer 49. A fiber with a perpendicular cleave or polish laid in the groove will not be able to be positioned any closer than about 23 microns from a waveguide on the surface. To get a vertical etched surface in Si, one can use a substrate with a non-standard (and, therefore, more expensive) crystallographic orientation denoted as a <110> wafer, but such wafers will not etch the required grooves.

Figure 6:
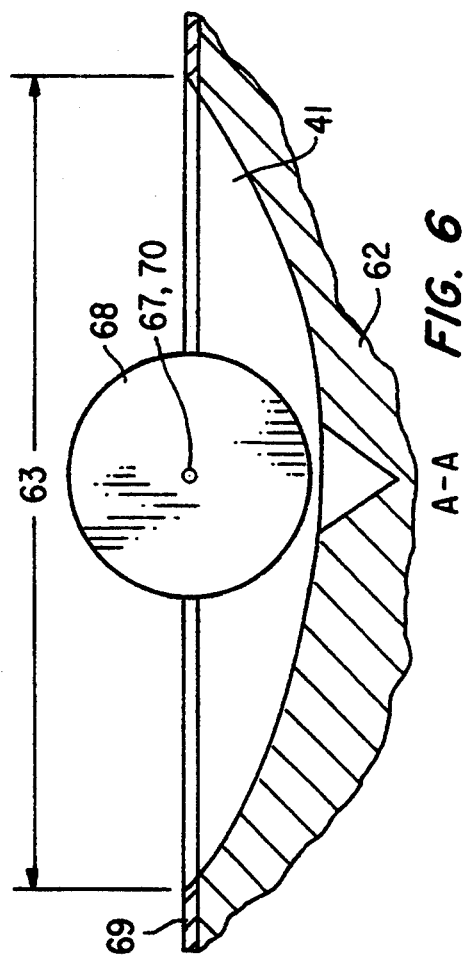
FIG. 6 illustrates an end view of a coupling between fiber and waveguide having a diamond saw cut.
Figure 7:
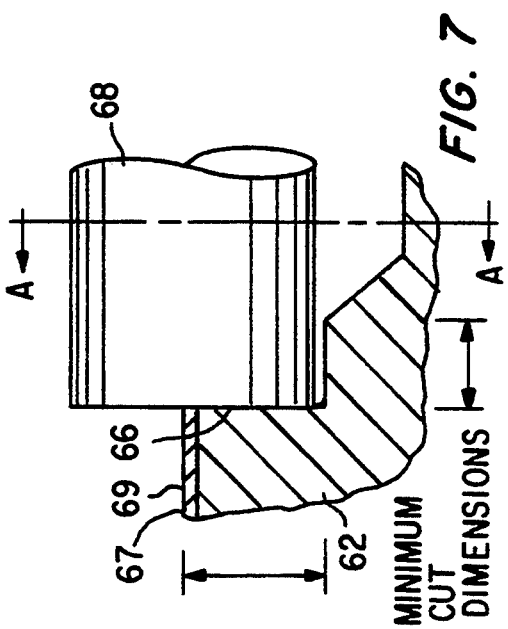
FIG. 7 illustrates a side view of a coupling between fiber and waveguide having a diamond saw cut.

One option, as shown in FIGS. 6 and 7, is to form a vertical face 66 on the substrate 62 and waveguide layer 69, perpendicular to the groove 41 and the waveguide 67 in the surface layer 69, after the grooves have been formed, using a diamond saw-cut or other mechanical method such as ultrasonic grinding. For example, a 1 mm. diameter dentist's burr (designed to be used at 300,000 rpm. in an air-driven spindle) would only need to make a scarf 63 about 0.5 mm. wide at the surface, as shown in FIG. 6. The burr would have to be at least 35 um. (0.0013") thick, but could be much thicker, if necessary, as shown in FIG. 7. Butt-coupling of central guiding core 70 of fiber 68 to waveguide 69 is then possible.

As illustrated in FIGS. 8 and 9, another option is, prior to etching of the V-groove 44, first to form the vertical face 82 on the surface waveguide 84 and substrate 86 by means of ultrasonic grinding or a reactive ion etch, (with appropriate etch chemistry and enough acceleration potential) to create a near-vertical hole 88 about 40 microns deep.

FIGS. 10 and 11 illustrate that when groove 92 is subsequently etched in substrate 94, the etch process produces an undercut under the surface layer 96, permitting a "face-contact" between core 99 of the optical fiber 98 and the waveguide 89 in the surface layer 96.

Either of these techniques for providing a precision groove and a matching vertical face on a surface waveguide will overcome the problem of precision alignment of the core of the optical fiber with the surface optical waveguide.

The other time-consuming part of the fiber attachment process is the preparation of the fiber itself. For attachment using the invention described above, the bare fiber is required with a perpendicular end face. Standard techniques suffice for removing the jacket or other covering of the coated fiber. Removal of the coming can be accomplished mechanically, either with or without the aid of a chemical solvent or heat. The preparation of the perpendicular face will be less conventional. The bare end of the fiber should extend beyond the remaining coating only as far as necessary to enter the precision groove, perhaps 2 or 3 mm. For a true "face-contact", the end of the fiber should be polished, which is a difficult process for a bare fiber. It may be satisfactory simply to cleave the end of the fiber, if the angle of the cleave can be kept to less than a ½ degree or so. Etching with Hydrofluoric acid (HF) is a less desirable alternative, but would result in a rounded fiber end in which the central optical guide would protrude farthest, and hence make good contact with the surface waveguide even with very bad cleaving angles of 5 degrees or more. If these techniques do not suffice, the polishing of the fiber end can be accomplished by first potting the bare fiber into a capillary sleeve and then polishing the end in a conventional fiber polisher, followed by removing the fiber from the capillary using heat, solvents, or a combination of both. (The fiber may have to be cleaned after this process to ensure proper alignment by the precision grooves.). Although the latter technique may seem laborious, it is hardly more so than the present method of fiber preparation for precision alignment and attachment of fibers to OEIC; and the simpler methods described above, if successful, would save much effort.

The fibers can be held in place either by an index-matching epoxy or a mechanical hold-down plate or preferably both. The hold-down plate should preferably be transparent to the UV curing radiation, so that if necessary, particularly in development, performance can be verified with the hold-down plate in place, prior to the curing cycle. The hold-down plate may also incorporate electrical connections to the electrical circuits of the OEIC by means of the solder-bumps. Alignment would be facilitated if the hold-down plate incorporates matching grooves, which would permit blind assembly, by using the fibers themselves as the locating fiducial references. A close-fitting metal cover is very desirable, both to shield the OEIC from stray light and to shield the electrical circuits from electromagnetic interference. Strain relief of the bare fiber back to the coating is facilitated if the undisturbed coating is close to the edge of the OEIC. If this has been accomplished properly in the fiber preparation, a simple drop of appropriate silicone or other material should suffice. Additional strain relief between the cover of the OEIC and the jacket of the fiber can be provided, if necessary, for particular applications.

This invention is applicable to all OEICs which use silicon as a substrate. This specifically includes the use of a silicon substrate to support emitters such as InGaAsP/InP long wavelength lasers, as well as receivers, detectors, amplifiers and the like. The invention is also applicable to OEICs using waveguides formed on the surface using either glass or silica as well as by ion implantation or other methods. The invention is also applicable to passive optical circuits formed on silicon substrates by any process.

Note that, in order to provide efficient optical coupling from the fiber to the surface waveguide, it is necessary that the optical mode sizes in the two guides be matched in both vertical and horizontal directions. In some cases, it may be desirable that the surface guide be at an angle with respect to the axis of the V-groove, in order to facilitate the mode-matching, rather than exactly parallel to the V-groove. This is also within the scope of the present invention.

It is not intended that this invention be limited to the hardware arrangement, or operational procedures shown disclosed. This invention includes all of the alterations and variations thereto as encompassed within the scope of the claims as follows.

What is claimed is:

1. A method of attaching optical fibers comprising the steps of:
   providing a precision groove on a substrate, essentially parallel and in line with a waveguide in a transparent surface layer on said substrate;
   providing a vertical face on said waveguide;
   providing each of said optical fibers with a perpendicular end face;
   providing clearance in said substrate for said perpendicular end face of each of said optical fibers to make face contact with said vertical face on said waveguide; and
   clamping said optical fibers in place including applying an ultraviolet curable material to said fibers, disposing a clamping plate transparent to ultraviolet curing radiation over said fibers, and verifying performance with the clamping plate in place.

2. A method of attaching optical fibers as claimed in claim 1 wherein providing said precision groove, providing said vertical face on said waveguide and providing said clearance in said substrate comprises the steps of:
   etching said precision groove; and then
   producing said vertical face on said waveguide by mechanical means; and
   at the same time providing said clearance in said substrate.

3. A method of attaching optical fibers as claimed in claim 2 wherein producing said vertical face on said waveguide by mechanical means comprises the steps of:

using a diamond or other dentist's burr of diameter of approximately one millimeter, and width of at least 35 micrometers, designed to be used at approximately 300,000 rpm, in an air-driven spindle; and then grinding a hole with side of said diamond or other dentist's burr between said waveguide and said precision groove, perpendicular to said precision groove, to a depth at least equal to radius of each of said optical fibers, resulting in a scarf approximately 0.5 mm. wide.

4. A method of attaching optical fibers as claimed in claim 2 wherein producing said vertical face on said waveguide by mechanical means comprises the step of:

using an ultrasonic grinding device to produce a near-vertical hole between said waveguide and said precision groove, said hole being at least as wide as each of said optical fibers, and of sufficient depth and length to provide said clearance.

5. A method of attaching optical fibers as claimed in claim 1 wherein providing said precision groove, providing said vertical face on said waveguide and providing said clearance in said substrate comprises the steps of:

etching said precision groove; and then producing said vertical face on said waveguide by electrochemical means; and, at the same time providing said clearance in said substrate.

6. A method of attaching optical fibers as claimed in claim 5 wherein producing said vertical face on said waveguide by electrochemical means comprises the step of:

using a reactive ion etch with appropriate chemistry and enough acceleration potential to create a near-vertical hole, said hole being as wide as each of said optical fibers, and of sufficient depth and length to provide said clearance.

7. A method of attaching optical fibers as claimed in claim 1 wherein providing said precision groove, providing said vertical face and providing said clearance comprises the steps of:

using mechanical means to provide a near-vertical hole between said waveguide and location where said precision groove will subsequently be etched, said near-vertical hole being as wide as each of said optical fibers and of sufficient depth (approximately 40 micrometers) and length so that, when etched at same time as said precision groove, said near-vertical hole will provide said clearance; and then, etching said precision groove and said substrate around said near-vertical hole to provide said clearance.

8. A method of attaching optical fibers as claimed in claim 7 wherein using mechanical means comprises the steps of:

using an ultrasonic grinding device to produce said near-vertical hole.

9. A method of attaching optical fibers as claimed in claim 1 wherein providing said precision groove, providing said vertical face and providing said clearance comprises the steps of:

using electrochemical means to provide a near-vertical hole between said waveguide and location where said precision groove will subsequently be etched, said near-vertical hole being as wide as each of said optical fibers and of sufficient depth (approximately 40 micrometers) and length so that, when etched at same time as said precision groove, said near-vertical hole will provide said clearance; and then, etching said precision groove and said substrate around said near-vertical hole to provide said clearance.

10. A method of attaching optical fibers as claimed in claim 9 wherein using electrochemical means comprises the step of:

using a reactive ion etch with appropriate chemistry and enough acceleration potential to create said near-vertical hole.

* * * * *